(12) United States Patent
Imanishi et al.

(10) Patent No.: US 7,937,997 B2
(45) Date of Patent: May 10, 2011

(54) TIRE BRAKING CHARACTERISTIC TEST APPARATUS

(75) Inventors: Etsujiro Imanishi, Kobe (JP); Masahiko Mizuno, Owariasahi (JP)

(73) Assignee: Kabushiki Kaisha Kobe Seiko Sho, Hyogo (JP)

( * ) Notice: Subject to any disclaimer, the term of this patent is extended or adjusted under 35 U.S.C. 154(b) by 200 days.

(21) Appl. No.: 12/224,795

(22) PCT Filed: Apr. 11, 2007

(86) PCT No.: PCT/JP2007/057990
§ 371 (c)(1),
(2), (4) Date: Sep. 5, 2008

(87) PCT Pub. No.: WO2007/119750
PCT Pub. Date: Oct. 25, 2007

(65) Prior Publication Data
US 2009/0095064 A1    Apr. 16, 2009

(30) Foreign Application Priority Data

Apr. 14, 2006 (JP) .................................. 2006-112515

(51) Int. Cl.
*G01M 17/02* (2006.01)
(52) U.S. Cl. .......................................... 73/121; 73/146
(58) Field of Classification Search ............... 73/121, 73/146
See application file for complete search history.

(56) References Cited

U.S. PATENT DOCUMENTS

| | | | | |
|---|---|---|---|---|
| 3,977,243 A | * | 8/1976 | Yamada et al. ................ | 73/146 |
| 4,160,378 A | * | 7/1979 | Himmler ......................... | 73/146 |
| 4,238,954 A | * | 12/1980 | Langer ............................ | 73/146 |
| 4,344,324 A | * | 8/1982 | Langer ............................ | 73/146 |
| 4,499,759 A | * | 2/1985 | Hull ................................. | 73/146 |
| 4,848,143 A | * | 7/1989 | Ushikoshi ...................... | 73/146 |
| 5,481,907 A | | 1/1996 | Chasco et al. | |
| 5,942,673 A | * | 8/1999 | Horiuchi et al. .............. | 73/11.04 |
| 5,992,227 A | * | 11/1999 | Jellison et al. ................. | 73/146 |
| 6,016,695 A | * | 1/2000 | Reynolds et al. .............. | 73/146 |
| 6,234,011 B1 | * | 5/2001 | Yamagishi et al. ......... | 73/118.01 |
| 6,247,348 B1 | * | 6/2001 | Yamakado et al. .......... | 73/11.04 |
| 7,140,242 B1 | * | 11/2006 | Poling et al. ................... | 73/146 |
| 7,222,522 B2 | * | 5/2007 | Monguzzi et al. ............. | 73/146 |
| 7,421,890 B2 | * | 9/2008 | Imanishi et al. ............... | 73/146 |

(Continued)

FOREIGN PATENT DOCUMENTS

DE           694 23 341           12/1994

(Continued)

OTHER PUBLICATIONS

Office Action from Chinese Patent Office dated Mar. 24, 2010, App 200780013484.1.

(Continued)

*Primary Examiner* — Freddie Kirkland, III
(74) *Attorney, Agent, or Firm* — Stites & Harbison PLLC; Juan Carlos A. Marquez, Esq.

(57) ABSTRACT

The present invention regards a tire braking characteristic test apparatus which can reflect the dynamic characteristics of a vehicle at the time of braking in order to evaluate the braking characteristics of tires. The test apparatus can also perform a test where a vehicle condition is changed in a manner which influences the braking characteristics of the tires.

6 Claims, 15 Drawing Sheets

U.S. PATENT DOCUMENTS

2004/0255661 A1   12/2004   Nagai et al.

FOREIGN PATENT DOCUMENTS

| | | |
|---|---|---|
| EP | 0 683 894 | 12/1994 |
| EP | 1 422 508 | 7/2002 |
| EP | 1 422 508 A1 | 5/2004 |
| JP | 05-164659 | 6/1993 |
| JP | 8-507152 | 12/1994 |
| JP | 08-507152 | 7/1996 |
| JP | 2002-062223 | 2/2002 |
| WO | WO 95/16903 | 6/1995 |
| WO | WO 03/010505 | 2/2003 |

OTHER PUBLICATIONS

International Search Report of PCT/JP2007/057990 mailed May 22, 2007.

* cited by examiner

TIRE BRAKING CHARACTERISTIC TEST APPARATUS

TECHNICAL FIELD

The present invention relates to a tire braking characteristic test apparatus capable of performing a test with regard to braking characteristic of tires under the condition which is close to actual running of a vehicle.

BACKGROUND ART

The braking performance of the tires arranged in a passenger automobile or the like is frequently evaluated by an actual running test in which an automobile actually runs. In the actual running test, although the braking performance of the tires can be precisely evaluated, there is a problem that reproducibility of a road condition and the like is poor.

Therefore, various tire test apparatuses are proposed instead of the actual running test.

For example, Patent Document 1 discloses a tire tester in which tires capable of rolling are brought in contact with a substitute road surface formed by ice or the like so as to measure braking characteristic of the tires on a virtual road surface formed by the substitute road surface. However, the tire tester is to evaluate the braking performance of the tires themselves on the virtual road surface but not to evaluate braking performance of the tires mounted on a vehicle.

When mounted on the vehicle, the tires receive dynamic characteristic of the vehicle as well as influence over the dynamic characteristic of the vehicle. The tires and the vehicle influence over each other on the dynamic characteristic as mentioned above. Therefore, at the time of braking of the vehicle, not only the braking characteristic of the vehicle but also the braking characteristic of the tires are complicated, and the braking characteristic of the tires arranged in the vehicle is also varied in accordance with a position to be arranged in the vehicle. In recent years, in order to evaluate the braking characteristic of the tires, a tire tester in consideration to such a relationship between the tires and the vehicle is also developed.

For example, Patent Document 2 discloses a compound testing device in which in a state that tires of an experimental vehicle are disposed on a flat plate, a brake of the experimental vehicle is operated so that braking performance and sideslip performance of the experimental vehicle are measured.
Patent Document 1: Japanese Patent Laid-Open No. 2002-62223
Patent Document 2: Japanese Patent Laid-Open No. Hei5-164659

DISCLOSURE OF THE INVENTION

Problems to be Solved by the Invention

However, in the compound testing device disclosed in Patent Document 2, although the braking performance and the sideslip performance of the experimental vehicle can be measured as mentioned above, there is a problem that behavior of the tires resulted from a dynamic motion of the experimental vehicle cannot be obtained in detail.

In the compound testing device disclosed in Patent Document 2, the tires are mounted on the experimental vehicle and then a test is performed. Therefore, in the case where the test is performed with changing a condition of weight distribution of the vehicle, wheelbase or the like, an experimental vehicle meeting the condition has to be prepared and there is a problem that the test is extremely large scale.

Therefore, the present invention is to provide a tire braking characteristic test apparatus capable of reflecting dynamic characteristic of a vehicle at the time of braking in order to evaluate braking characteristic of tires, and performing a test with easily changing a vehicle condition influencing the braking characteristic of the tires.

Means for Solving the Problems

In order to achieve the above object, the following technical means is explored in the present invention.

That is, the technical means for solving the problems in the present invention is a tire braking characteristic test apparatus comprising a substitute road surface body, a pair of tires capable of rolling on a virtual road surface formed by the substitute road surface body, braking force impartation means capable of imparting braking force to at least one of the tires, ground height control means capable of controlling ground height of the tires, ground load measurement means capable of measuring ground loads of the tires, front-rear force measurement means capable of measuring front-rear force of the tires, speed control means capable of controlling speed of the substitute road surface body, and processing/controlling means provided with a two-dimensional vehicle model adapted to be inputted actual measurement values of the ground loads and the front-rear force of the tires obtained from the ground load measurement means and the front-rear force measurement means, for performing a calculation processing with regard to a motion of the vehicle model on the basis of the actual measurement values, and outputting command values on the basis of the calculation processing to the ground height control means and the speed control means to control a rolling state of a pair of the tires.

According to the above, the tires are provided as hardware and tire control means provided with the vehicle model serving as a simulation model by software is connected to the tires. Therefore, it is possible to exchange data between the vehicle model and the tires bi-directionally. Thereby, dynamic characteristic of the vehicle can be reflected on the tires, and it is possible to perform the test under the condition which is extremely close to an actual running condition.

It should be noted that in the present invention, one of a pair of the tires is set to be a front wheel of the vehicle model and the other is set to be a rear wheel of the vehicle model.

In the present invention, force generated in the tires is defined in a coordinate system of the tires running on a flat road surface shown in FIG. 16. The coordinate system includes an intersection line between a center plane of the tire and the road serving as an x axis, and a tire rotation axis, an intersection line between a plane perpendicular to the road surface and the road surface serving as an y axis, and an axis perpendicular to the road surface passing through an origin which is an intersection point between the x axis and the y axis serving as an z axis. An angle formed by the x axis relative to the moving direction of the road surface is a sideslip angle (slip angle) α, and an angle formed by a perpendicular axis and the tire center plane on a ZY plane is a camber angle β. The ground height of the tires indicates a distance from the virtual road surface of the substitute road surface body to a rotation center of the tires in the radial direction of the tires.

The front-rear force in the present invention is force in the x axis direction indicated by FX in the figure, that is, force in the front-rear direction of the tires. The ground loads are force in the z axis direction indicated by FZ in the figure, that is, ground loads or load reaction force.

It should be noted that the sideslip angle $\alpha=0$, and the camber angle $\beta=0$ in the present invention.

A control method for the tire according to the present invention is firstly to impose braking force on a pair of the tires rolling on the virtual road surface formed by the substitute road surface body through the braking force impartation means. Thereby, the front-rear force and the ground loads generated by the braking force are imposed on a pair of the tires, and the front-rear force and the ground loads are measured by the respective measurement means.

Next, the actual measurement values of the front-rear force and the ground loads obtained by the respective measurement means are inputted to the vehicle model. Then, the calculation processing is performed on the actual measurement values through the vehicle model. The calculation processing is performed with regard to a two-dimensional motion of the vehicle model and a pitching motion, a speed change, other motions and the like of the vehicle model are calculated on the basis of the actual measurement values. Then, by performing the calculation processing, the command values of the ground height of the tires, speed of the substitute road surface body and the like are obtained.

Then, the command values are inputted to the ground height control means of the tires and the speed control means. Thereby, the ground height of the tires is controlled on the basis of the command values and the speed of the substitute road surface body is controlled on the basis of the command values. Therefore, two-dimensional braking characteristic of the vehicle model obtained by the calculation processing is reflected on the tires.

According to the present invention, a vehicle in which the tires are to be arranged is realized as a program on a computer as a vehicle model. Therefore, a vehicle condition which influences the dynamic characteristic of the tires can be easily changed.

Another technical means for solving the problems in the present invention is a tire braking characteristic test apparatus comprising a substitute road surface body, a pair of tires capable of rolling on a virtual road surface formed by the substitute road surface body, braking force impartation means capable of imparting braking force to at least one of the tires, angle control means for controlling a camber angle and a sideslip angle of the one of the tires, ground height control means capable of controlling ground height of the tires, ground load measurement means capable of measuring ground loads of the tires, front-rear force measurement means capable of measuring front-rear force of the tires, lateral force measurement means capable of measuring lateral force of the tires, speed control means capable of controlling speed of the substitute road surface body, and processing/controlling means provided with a three-dimensional vehicle model adapted to be inputted actual measurement values of the ground loads, the front-rear force and the lateral force of the tires obtained from the ground load measurement means, the front-rear force measurement means and the lateral force measurement means, and steering angle input means capable of inputting a steering angle to the vehicle model, for performing a calculation processing with regard to a motion of the vehicle model on the basis of the actual measurement values and the steering angle, and outputting command values on the basis of the calculation processing to the angle control means, the ground height control means and the speed control means to control a rolling state of a pair of the tires.

According to the above, it is possible to reflect a three-dimensional motion of the vehicle model on the tires whose braking characteristic is to be measured.

It should be noted that the lateral force of the tires in the present invention is FY shown in FIG. 16, and the sideslip angle $\alpha$ and the camber angle $\beta$ are given predetermined values.

A control method for the tire according to the present invention is firstly to impose the braking force on a pair of the tires rolling on the virtual road surface formed by the substitute road surface body through the braking force impartation means. Around the above, the steering angle is inputted to the vehicle model through the steering angle input means. Thereby, the sideslip angle to be imparted to the front wheel is calculated by the vehicle model, and the sideslip angle is inputted to the tire set to be the front wheel. Therefore, not only the front-rear force and the ground loads generated by the braking force but also the lateral force are imposed on a pair of the tires, and the front-rear force, the ground loads and the lateral force are measured by the respective measurement means.

Next, the actual measurement values of the front-rear force, the ground loads and the lateral force obtained by the respective measurement means are inputted to the vehicle model. Then, the calculation processing is performed through the vehicle model. The calculation processing is performed with regard to the three-dimensional motion of the vehicle model, and a pitching motion, a rolling motion, a yawing motion, a speed change, other motions and the like of the vehicle model are calculated on the basis of the actual measurement values. Then, by performing the calculation processing, the command values of the ground height of the tires, the camber angles, the sideslip angles and the speed of the substitute road surface body and the like are obtained.

Then, the command values are inputted to the ground height control means of the tires, the angle control means and the speed control means. Thereby, the ground height of the tires, the camber angles and the sideslip angles are controlled on the basis of the command values and the speed of the substitute road surface body is controlled on the basis of the command values. Therefore, three-dimensional braking characteristic of the vehicle model obtained by the calculation processing can be reflected on the tires.

The tire braking characteristic test apparatus according to the present invention preferably comprises two sets of the substitute road surface bodies, a pair of the tires, the braking force impartation means, the angle control means, the ground height control means, the ground load measurement means, the front-rear force measurement means, the lateral force measurement means, and the speed control means.

Thereby, four tires are prepared for the vehicle model, and the tires can be set to be a left front wheel, a right front wheel, a left rear wheel and a right rear wheel respectively. It is possible to perform a tire braking characteristic test in a state further close to the actual running test.

Further preferably, the processing/controlling means is provided with a simulation driving device, and the steering angle input means is arranged in the simulation driving device.

By providing the simulation driving device, it is possible to realize a virtual running test.

Effect of the Invention

According to the tire braking characteristic test apparatus of the present invention, it is possible to reflect the dynamic characteristic of the vehicle at the time of braking in order to evaluate the braking characteristic of the tires, and also perform the test with easily changing the vehicle condition influencing the braking characteristic of the tires.

EXPLANATION OF REFERENCE NUMERALS

Figure 1:
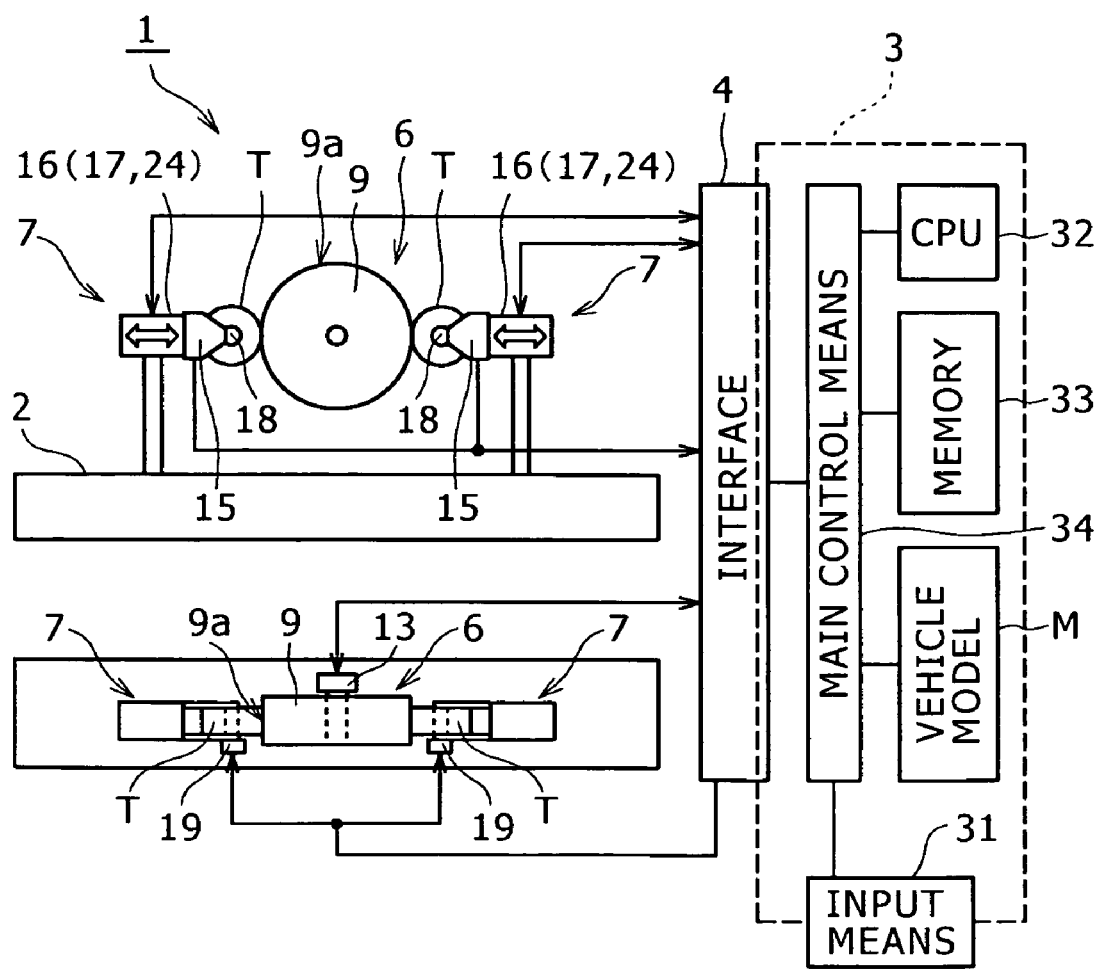
FIG. 1 A system configuration diagram showing a first embodiment of a tire braking characteristic test apparatus.

1: Braking characteristic test apparatus
2: Tire rolling device
3: Processing/controlling device (processing/controlling means)
4: Interface
6: Driving portion
7: Tire supporting portion
9: Substitute road surface body
9a: Virtual road surface
13: Speed control means
15: Tire supporting body
16: Ground height control means
17: Ground load measurement means
18: Front-rear force measurement means
19: Braking force impartation means
24: Ground height measurement means
40: Angle control means
41: Lateral force measurement means
42: Camber angle impartation means
43: Sideslip angle impartation means
58: Steering angle input means
60: Simulation driving device
T: Tire
M: Vehicle model

BEST MODES FOR CARRYING OUT THE INVENTION

Hereinafter, a description will be given to embodiments of the present invention with reference to the drawings.

As shown in FIG. 1, in a first embodiment of a braking characteristic test apparatus 1 for tires T according to the present invention, a tire rolling device 2 for rolling a pair of the tires T and a processing/controlling device (processing/controlling means) 3 provided with a vehicle model M are provided. The tire rolling device 2 and the processing/controlling device 3 are connected to each other through an interface 4.

It should be noted that in FIG. 1, the tire rolling device 2 on the left upper side of the figure is a front view, and the tire rolling device 2 on the left lower side is a plan view (hereinafter, the same is applied to FIGS. 7 and 15).

Figure 2:
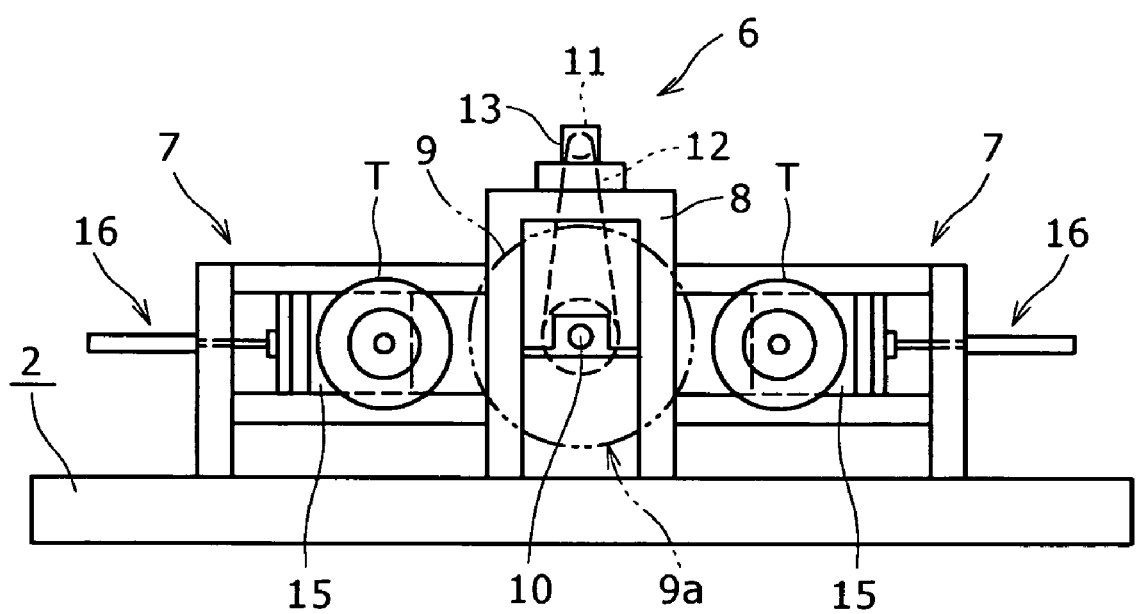
FIG. 2 A front view of a tire rolling device.
Figure 3:
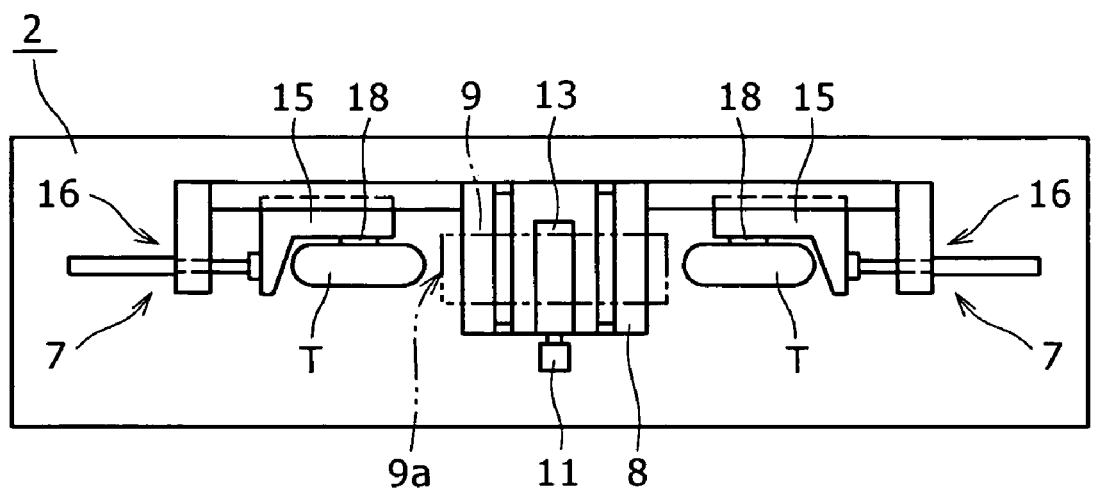
FIG. 3 A plan view of the tire rolling device.

As shown in FIGS. 2 and 3, the tire rolling device 2 is provided with a driving portion 6 for rolling the tires T and a pair of tire supporting portions 7 for supporting the tires T.

The driving portion 6 is provided with a frame 8 in which upper ends of four pillars are connected to each other by a beam member. A substitute road surface body 9 is pivotally supported by the frame 8.

The substitute road surface body 9 is made by a drum formed in a cylindrical shape. An axis body 10 is arranged on an axis center of the substitute road surface body 9. The axis body 10 is pivotally supported by the frame 8 in a state that the axis center is horizontally placed.

A drive device 11 formed by an electric motor is arranged in an upper part of the frame 8. The drive device 11 and the substitute road surface body 9 are engaged and coupled with each other by a winding transmission body 12. Therefore, by starting the drive device 11, the substitute road surface body 9 is rotated in the vertical direction. An outer peripheral surface of the substitute road surface body 9 to be brought in contact with the tires T is set to be a virtual road surface 9a.

The drive device 11 is provided with speed control means 13 for measuring and controlling rotation speed of the substitute road surface body 9. As shown in FIG. 1, the speed control means 13 is connected to the processing/controlling device 3 through the interface 4.

A pair of the tire supporting portions 7 are arranged through the substitute road surface body 9 and support the tires T in a state that tread surfaces of the tires T are opposed to the virtual road surface 9a of the substitute road surface body 9. Rotation axes of the tires T are supported in parallel to the axis body 10 of the substitute road surface body 9. Thereby, the tires T are also rotated in the vertical direction.

As shown in FIGS. 1 to 3, the tire supporting portion 7 is provided with a tire supporting body 15 for supporting the tire T, ground height control means 16 capable of measuring and controlling ground height of the tire T, ground load measurement means 17 for measuring ground loads of the tire T, front-rear force measurement means 18 for measuring front-rear force of the tire T and braking force impartation means 19 for imparting braking force to the tire T.

Figure 4:
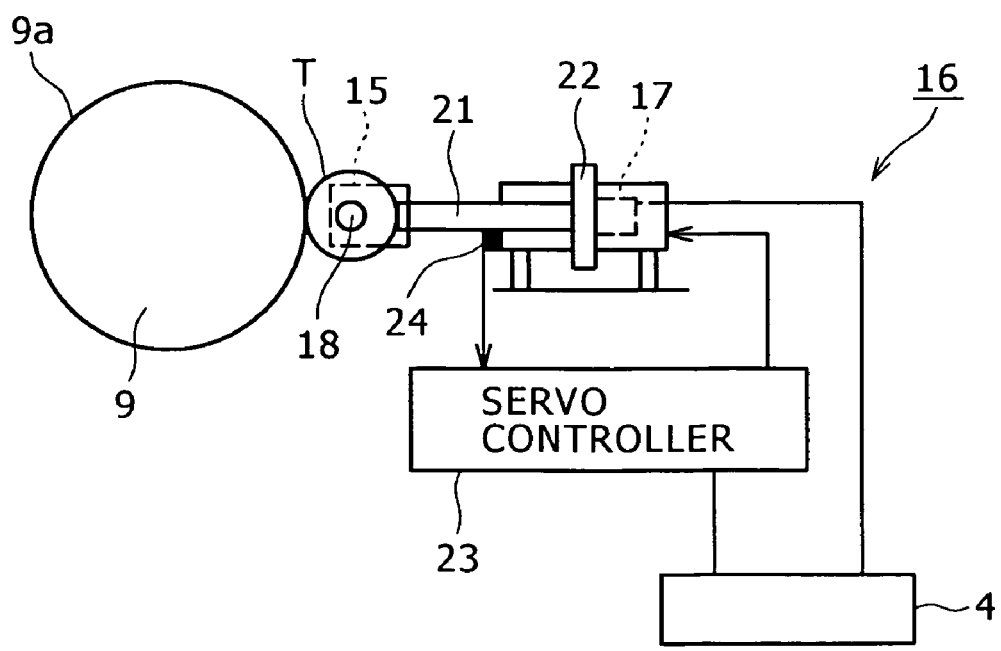
FIG. 4 An image view showing a configuration of ground height control means.

In order to control the ground height of the tire T, as shown in FIG. 4, the ground height control means 16 is provided with a screw jack 21 for supporting the tire supporting body 15, a servomotor 22 coupled with the screw jack 21 and a servo controller 23 for controlling the servomotor 22. By rotating the screw jack 21 through the servomotor 22, the tire T supported by the tire supporting body 15 can be brought close to and separated from the virtual road surface 9a. In order to measure the ground height of the tire T, the ground height control means 16 is provided with ground height measurement means 24 for measuring the ground height of the tire T in the vicinity of the screw jack 21.

The servo controller 23 is connected to the processing/controlling device 3 through the interface 4. The ground height measurement means 24 is connected to the servo controller 23 and connected to the processing/controlling device 3 through the interface 4.

The ground load measurement means 17 is attached to the screw jack 21 or the servomotor 22 and connected to the processing/controlling device 3 through the interface 4.

As shown in FIG. 1, the front-rear force measurement means 18 is arranged in a supporting axis for supporting the tire T and connected to the processing/controlling device 3 through the interface 4.

The braking force impartation means 19 is formed by a braking device in a disc type or a drum type, arranged in the tire supporting portion 7 and connected to the processing/controlling device 3 through the interface 4.

The processing/controlling device 3 is provided with the two-dimensional vehicle model M stored in a hard disk or the like, input means 31 capable of operating the vehicle model M and the tire rolling device 2, a CPU 32 and a memory 33. The above elements and the interface 4 are connected to each other through main control means 34.

The vehicle model M is formed as software of a computer capable of being inputted actual measurement values of the ground height, the ground loads and the front-rear force of the tires T obtained from the ground height measurement means 24 of the ground height control means 16, the ground load measurement means 17 and the front-rear force measurement means 18.

Figure 5:
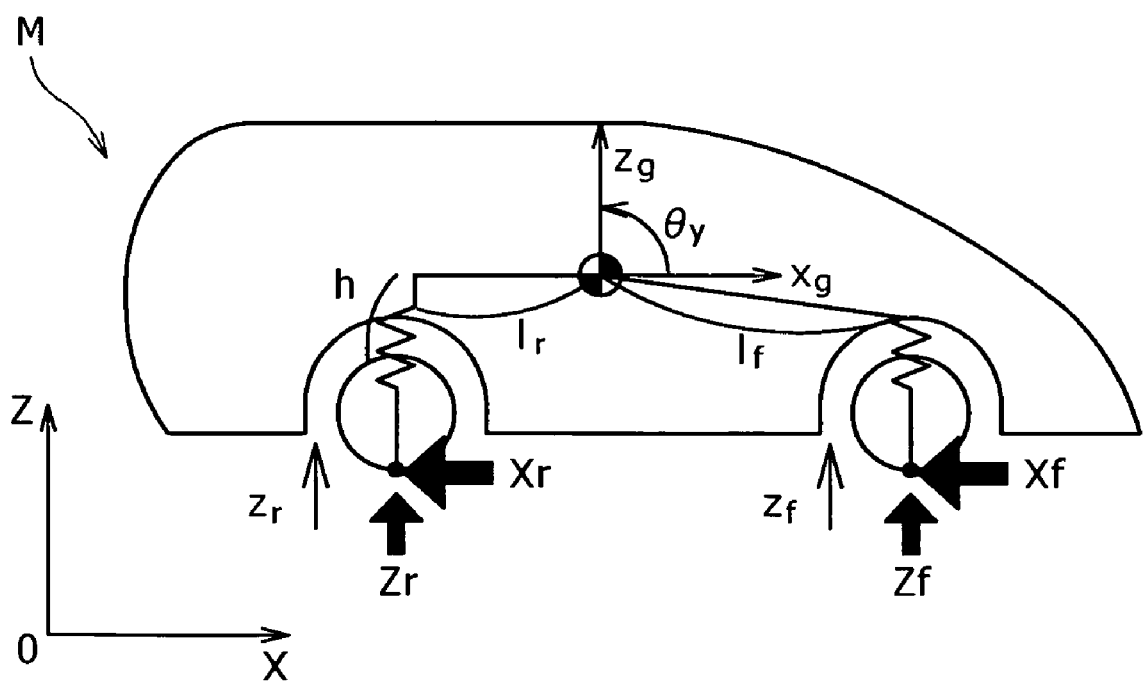
FIG. 5 An image view of a vehicle model.

As shown in a schematic view of FIG. 5, the vehicle model M used in the present embodiment is formed by modeling a vehicle and a suspension mechanism with using a beam element or a truss element in the finite element method, and rigidity of the vehicle and geometric nonlinearly of the suspension mechanism or the like are also taken into consideration.

In the vehicle model M, nodes have three degrees of freedom: in the x direction; in the z direction; and around the y axis. The nodes are connected by the beam elements in consideration to rotation in the finite element method. Thereby, the vehicle model M can take a pitching motion into consideration in addition to motions in the up and down direction and the front-rear direction of the vehicle and express a two-dimensional motion of the vehicle.

Figure 6:
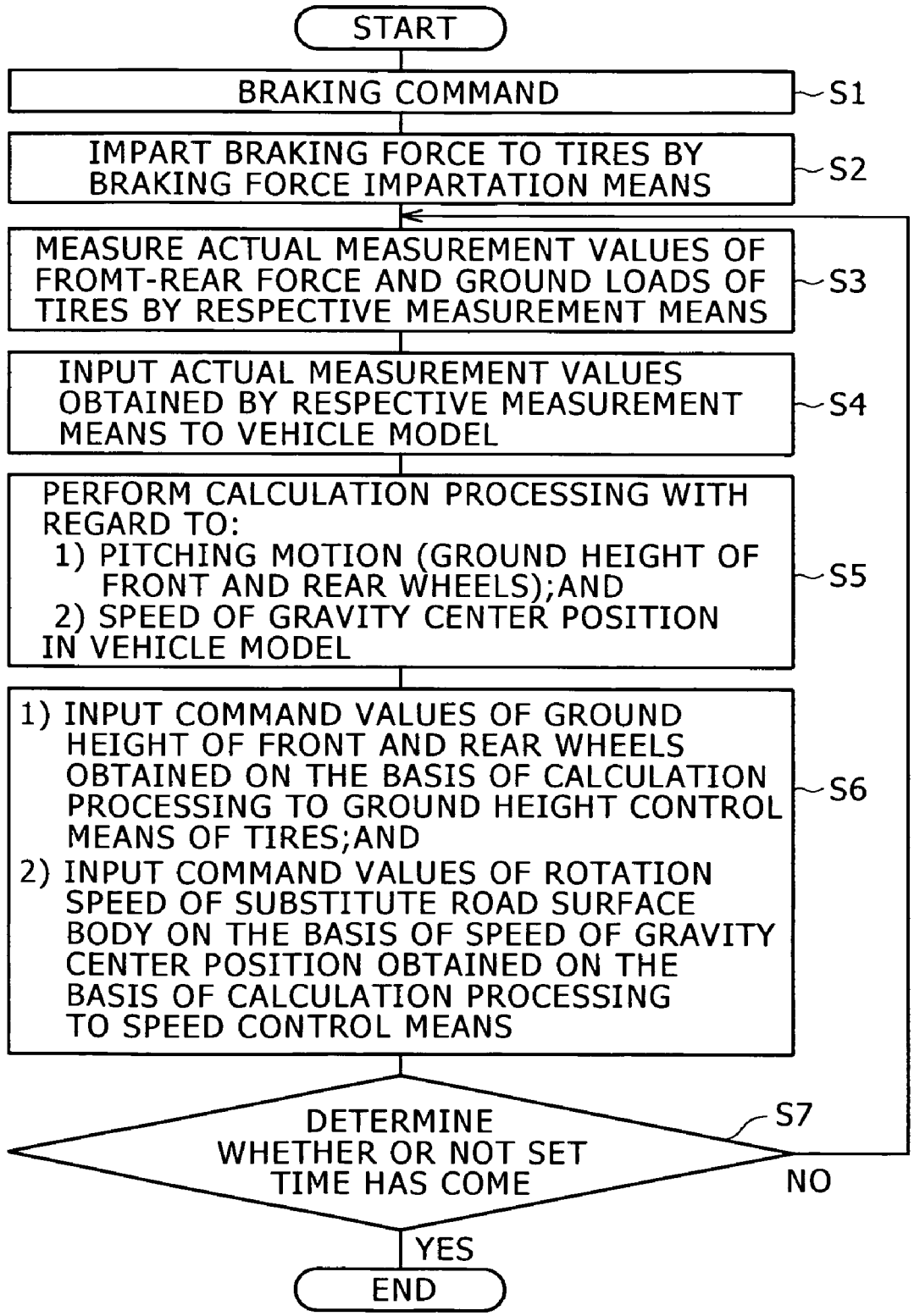
FIG. 6 A flowchart showing a process for controlling tires.

The braking characteristic test apparatus 1 for the tires T according to the present embodiment has the above configuration. Next, a description will be given to a process for controlling a pair of the tires T rolling on the virtual road surface 9a by the braking characteristic test apparatus 1 with reference to FIG. 6.

As a previous step for the above process, by adjusting positions of the tire supporting bodies 15 relative to the substitute road surface body 9, the tread surfaces of the tires T are brought in contact on the virtual road surface 9a. Then, the drive device 11 is started so as to rotate the substitute road surface body 9. Following the above, a pair of the tires T roll on the substitute road surface. Here, one tire T of a pair of the tires T is set to be a front wheel of the vehicle model M, and the other tire T is set to be a rear wheel of the vehicle model M.

In order to control a pair of the tires T from the above state to a desired braking state, a braking command is firstly inputted to the braking force impartation means 19 through the input means 31 in Step S1.

Thereby, the flow moves to Step S2 and the braking force is respectively imposed on a pair of the tires T rolling on the virtual road surface 9a by the braking force impartation means 19 which receives the braking command. At the above time, it is possible to properly set the braking force to be imposed on the tires T in accordance with the braking command in Step S1, for example to make the braking force to the front wheel larger than the braking force to the rear wheel.

By imposing the braking force, front-rear force $X_f$ and $X_r$ and ground loads $Z_f$ and $Z_r$ shown in FIG. 5 are imposed on the tires T. Here, the flow moves to Step S3 and the ground loads $Z_f$ and $Z_r$ and the front-rear force $X_f$ and $X_r$ are measured by the ground load measurement means 17 and the front-rear force measurement means 18.

Next, the flow moves to Step S4 and actual measurement values of the ground loads $Z_f$ and $Z_r$ and the front-rear force $X_f$ and $X_r$ of the tires obtained by the respective measurement means are inputted to the vehicle model M. Then, the flow moves to Step S5 and a calculation processing is performed on the above actual measurement values through the vehicle model M. In the calculation processing, the actual measurement values are substituted for a motion equation showing the two-dimensional motion of the vehicle model M. Thereby, the pitching motion, a speed change, other motions and the like of the vehicle model M are calculated in accordance with the actual measurement values.

In the present embodiment, by applying the Lagrange's motion equation to the two-dimensional vehicle model M shown in FIG. 5, the following equations (1) to (5) are obtained.

[Numerical Expression 1]

$$m_g \ddot{z}_g - k_r(z_r - z_g + l_r \theta_y) - k_f(z_f - z_g + l_f \theta_y) = m_g g \quad (1)$$

$$m_g \ddot{x}_g = -(X_r + X_f) \quad (2)$$

$$I_g \ddot{\theta}_y + l_r k_r(z_r - z_g + l_r \theta_y) - l_f k_f(z_f - z_g - l_f \theta_y) = -h(X_r + X_f) \quad (3)$$

$$m_r \ddot{z}_r + k_r(z_r - z_g + l_r \theta_y) = Z_r \quad (4)$$

$$m_f \ddot{z}_f + k_f(z_f - z_g - l_f \theta_y) = Z_f \quad (5)$$

$x_g$: Displacement in the x direction of gravity center
$z_g$: Displacement in the z direction of gravity center
$\theta y$: Rotation angle around y axis of gravity center
$z_f$, $z_r$: Displacement in the z direction of front and rear wheels
$m_g$: Mass of vehicle body
$I_g$: Inertia moment of vehicle body
$l_f$, $l_r$: Distance in the x direction from gravity center to rotation center of front and rear wheels
h: Distance in the z direction from virtual road surface to gravity center of vehicle body
$k_f$, $k_r$: Spring constant of suspension of front and rear wheels
$Z_f$, $Z_r$: Ground load of front and rear wheels
$X_f$, $X_r$: Front-rear force of front and rear wheels When the front-rear force $X_f$ and $X_r$ is generated in the tires in accordance with the impartation of the braking force to the tires T, the speed is changed in the vehicle model M as shown in the equation (2) and the pitching motion is generated as shown in the equation (3). When the above equations (1) to (5) are time integrated, displacement $x_g$ and $z_g$ of the gravity center position, rotation angles around the y axis of the gravity center and displacement $z_f$ and $z_r$ in the up and down direction of the front and rear tires T are respectively obtained. By time differentiating the displacement $x_g$ of the gravity center position, speed V of the gravity center position (vehicle model M) can also be obtained.

On the basis of the speed V of the gravity center position, rotation speed ω of the substitute road surface body 9 can be obtained by the following equation (6).

[Numerical Expression 2]

$$\omega = \frac{v}{r} \quad (6)$$

ω: Rotation speed of substitute road surface body
V: Speed of gravity center position of vehicle model
r: Rotation radius of substitute road surface body The ground height of the tires T is respectively equal to the displacement $z_f$ and $z_r$ in the up and down direction of the tires T. Thereby, the ground height $z_f$ and $z_r$ of the tires T can be obtained.

Then, the flow moves to Step S6, and the ground height $z_f$ and $z_r$ of the tires T and the rotation speed ω of the substitute road surface body 9 obtained by the above calculation processing are inputted to the ground height control means 16 of the tires T and the speed control means 13 thereof as command values. Thereby, the ground height $z_f$ and $z_r$ of the tires T is controlled on the basis of the actual measurement values and the rotation speed ω of the substitute road surface body 9 is controlled on the basis of the actual measurement values. Therefore, the two-dimensional braking characteristic of the vehicle model M obtained by the calculation processing is reflected on the tires T.

Then, the flow moves to Step S7, and the processing/controlling device 3 determines whether or not a set time has come. When it is determined to be NO, the flow moves to Step S3 and the process from Step S3 to Step S7 is repeated. When it is determined to be YES in Step S7, the process of controlling a braking state of the tires T is finished. Here, the "set time" indicates when the test is finished. That is, in Step S7, it is determined whether or not a predetermined test time has elapsed since the test is started. The same is applied to Step S18 in a second embodiment described later.

Alternatively, in a state that the two-dimensional braking characteristic of the vehicle model M is reflected in such a way, the ground height, the front-rear force and the ground loads of the tires T are measured again by the respective measurement means 17, 18 and 24. The calculation processing as mentioned above is performed again on the actual measurement values obtained from the above measurement. The command values obtained from the above can be inputted again to the ground height control means 16 and the speed control means 13. By such a process, it is further possible to perform a braking characteristic test of the tires T in a state which is extremely close to an actual running test.

According to the present embodiment, the braking characteristic test of the tires T can be performed with considering the braking characteristic of the vehicle due to the ground loads, the front-rear force and the ground height generated in the tires T when the braking force is imparted to the tires T. It is possible to perform the braking characteristic test of the tires T in a state which is extremely close to the actual running test.

Figure 7:
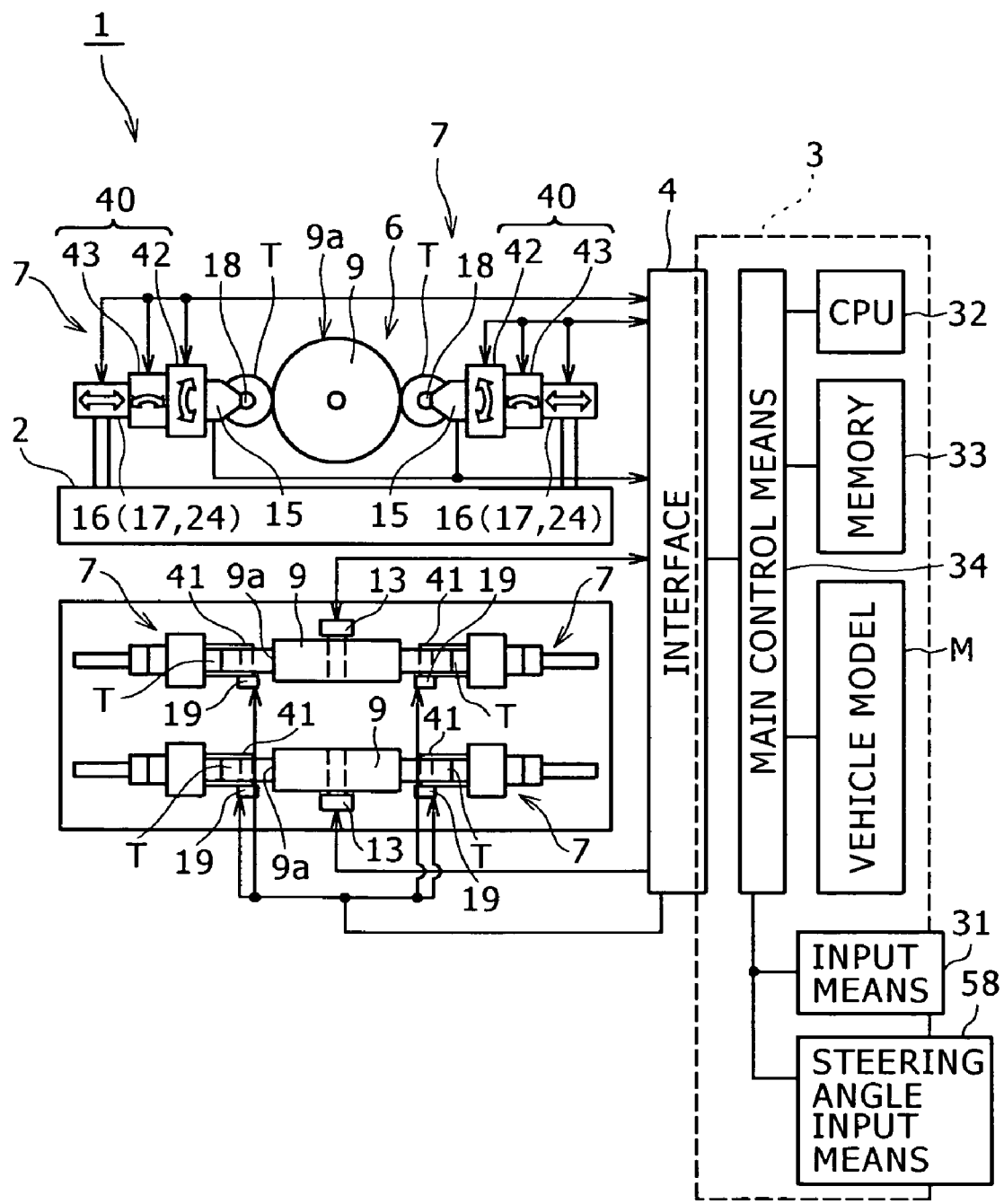
FIG. 7 A system configuration diagram showing a second embodiment of the tire braking characteristic test apparatus.

FIG. 7 shows the second embodiment of the present invention.

The braking characteristic test apparatus 1 of the tires T according to the present embodiment is provided with a pair of the tire rolling devices 2 installed in parallel so as to correspond to the rotation axis center of the substitute road surface body 9, and the processing/controlling device 3 provided with the vehicle model M. A pair of the tire rolling devices 2 and the processing/controlling device 3 are connected to each other through the interface 4.

Figure 8:
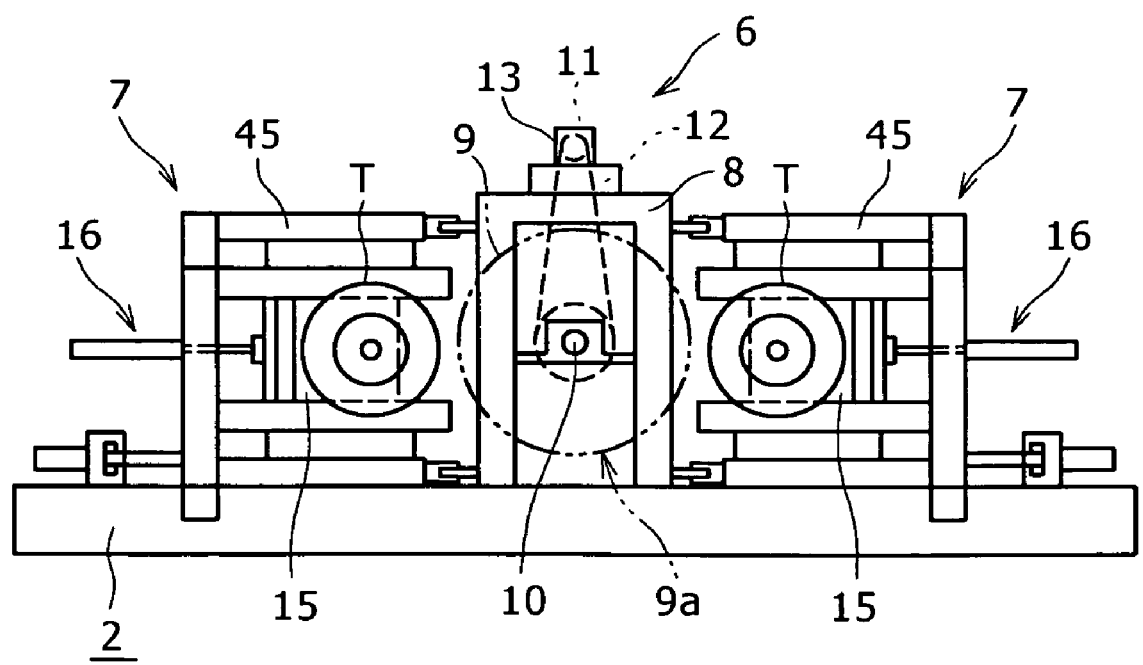
FIG. 8 A front view of a tire rolling device.
Figure 9:
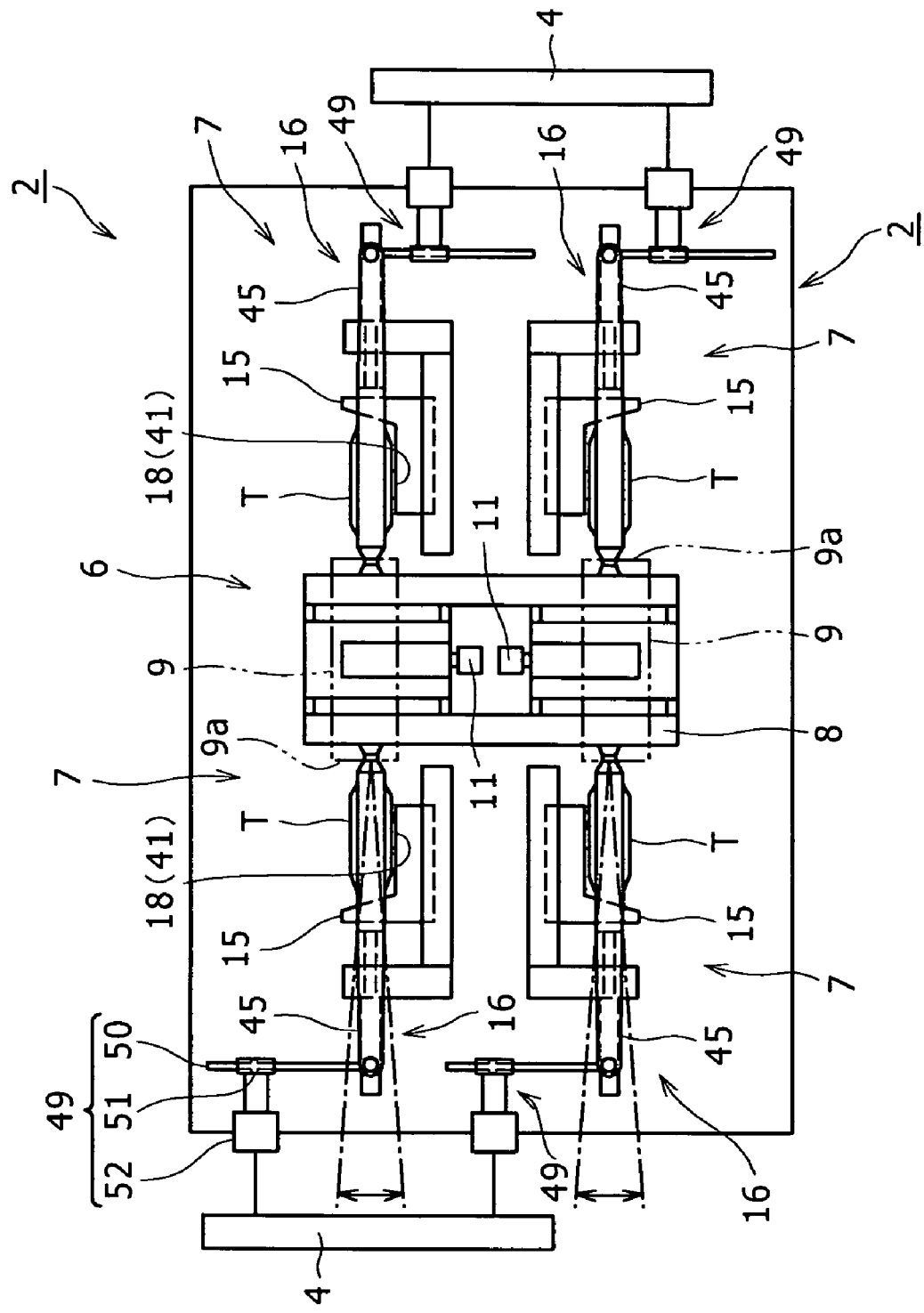
FIG. 9 A plan view of the tire rolling device.

As shown in FIGS. 8 and 9, the tire rolling device 2 is provided with a pair of the driving portions 6 for rolling the tires T. A pair of the tire supporting portions 7 for supporting the tires T are arranged in the driving portion 6 while opposing to each other.

The driving portion 6 is provided with the frame 8 in which the upper ends of the four pillars are connected to each other by the beam member. A pair of the substitute road surface bodies 9 are pivotally supported by the frame 8.

Since the shape of the substitute road surface body 9 and the configuration in which the drive device 11 and the speed control means 13 are arranged relative to the substitute road surface body 9 are the same as the first embodiment, the description thereof will be omitted here.

The configuration in which a pair of the tire supporting portions 7 arranged through the substitute road surface body 9 are respectively provided with the tire supporting body 15, the ground height control means 16, the front-rear force measurement means 18 and the braking force impartation means 19 is also the same as the first embodiment. In the present embodiment, in addition to the above configuration, angle control means 40 for controlling camber angles and sideslip angles of the tires T, and lateral force measurement means 41 for measuring lateral force imposed on the tires T are respectively provided in the tire supporting portions 7.

The angle control means 40 is provided with a camber angle impartation device 42 for imparting the camber angles to the tires T and a sideslip angle impartation device 43 for imparting the sideslip angles to the tires T.

Figure 10:
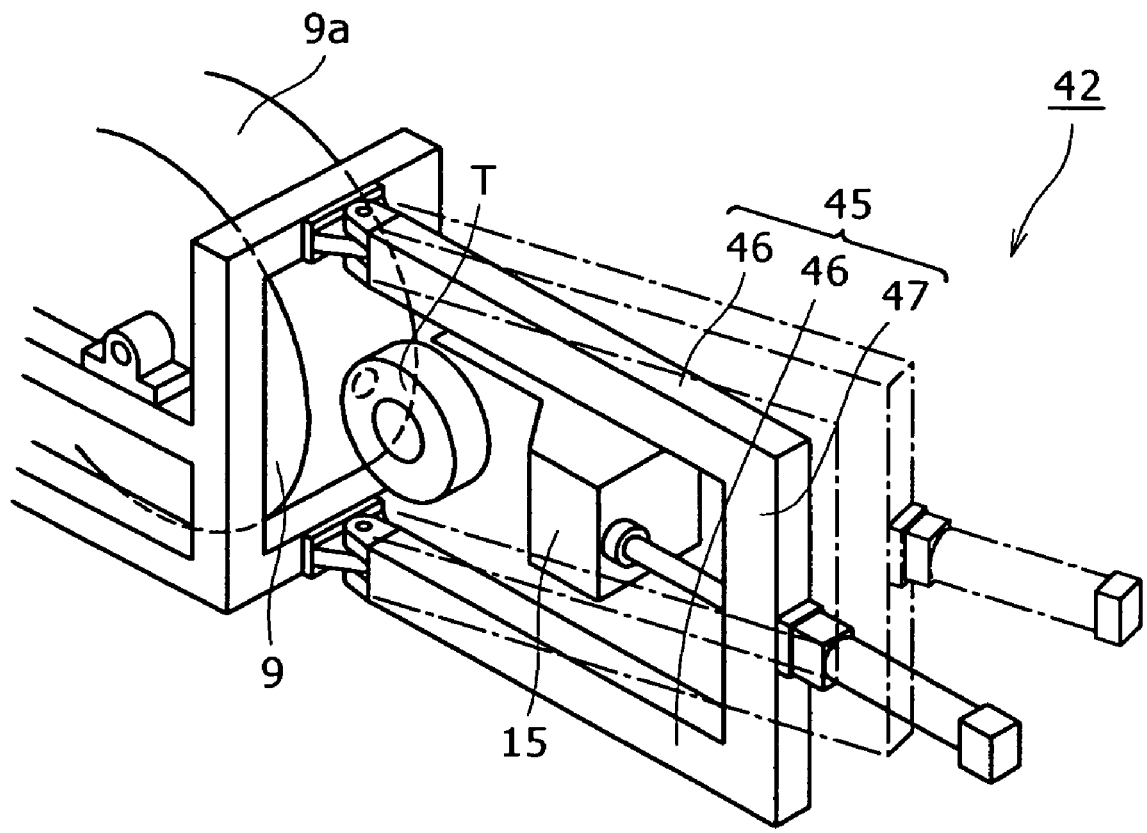
FIG. 10 An image view showing a configuration of camber angle impartation means.

As shown in FIG. 10, the camber angle impartation device 42 has an oscillation frame 45 provided so as to be rotated around a vertical axis center in the frame 8 of the driving portion 6. The oscillation frame 45 has a pair of upper and lower leg portions 46 pivotally supported by the frame 8 through a hinge mechanism so as to oscillate around the vertical axis center, and a connection portion 47 for connecting playing ends of a pair of the upper and lower leg portions 46.

It should be noted that the tire supporting body 15 is arranged between a pair of the leg portions 46 so as to come close to the substitute road surface body 9.

The connection portion 47 of the oscillation frame 45 is combined with a camber angle imparting actuator 49. As shown in FIG. 9, the camber angle imparting actuator 49 is provided with a screw axis 50 having one end pivotally supported by the connection portion 47, a nut 51 screwed on the screw axis 50 and a servomotor 52 for rotating the nut 51. By rotating the nut 51 by the servomotor 52, the screw axis 50 is moved in the axial direction. Thereby, oscillation of the oscillation frame 45 is controlled within a predetermined range of an angle α.

The servomotor 52 is connected to the processing/controlling device 3 through the interface 4.

The lateral force measurement means 41 is arranged in the oscillation arm 45 or the tire supporting body 15, and connected to the processing/controlling device 3 through the interface 4.

Figure 11:
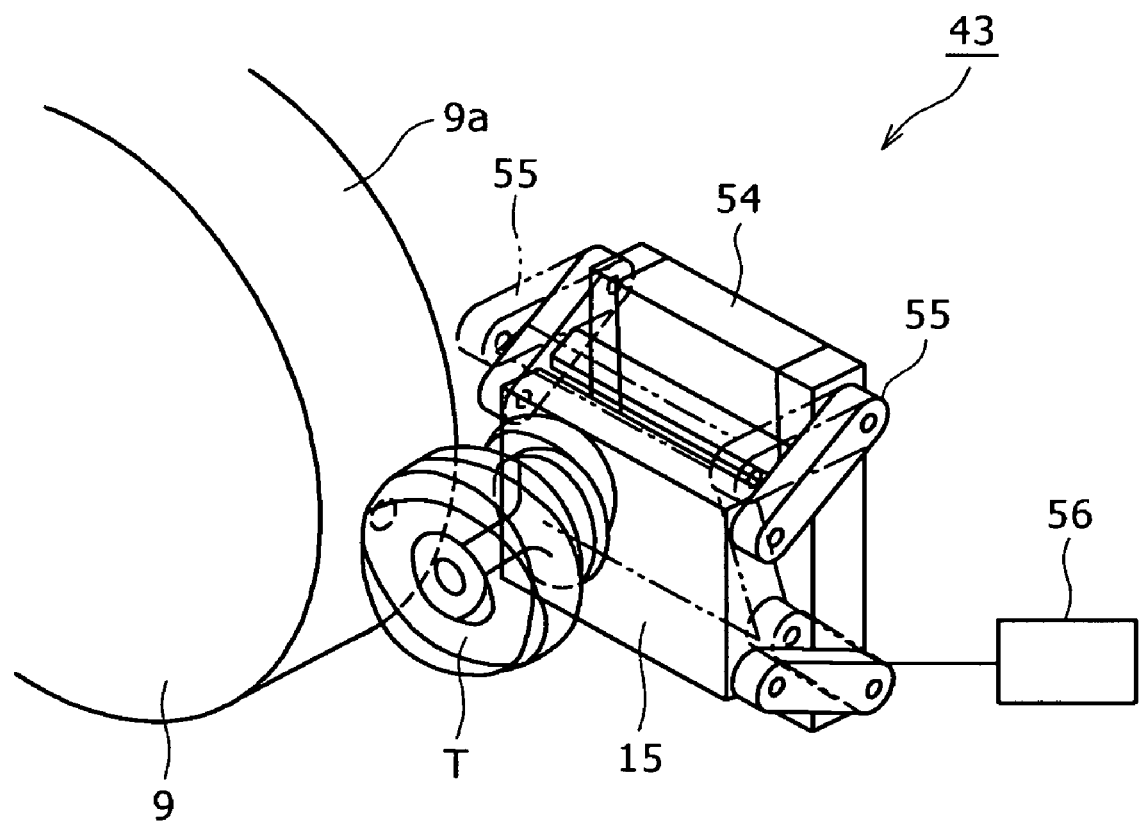
FIG. 11 An image view showing a configuration of sideslip angle impartation means.

As shown in FIG. 11, the sideslip angle impartation device 43 is provided with a substrate 54 arranged opposing to the tire supporting body 15 and a pair of link mechanisms 55 for coupling and supporting the tire supporting body 15 with the substrate 54. Thereby, the tire supporting body 15 is capable of oscillating relative to a plane perpendicular to a rotation axis of the substitute road surface body 9 (a plane perpendicular to the virtual road surface 9a). A pair of the link mechanisms 55 are connected to a sideslip angle imparting actuator 56 for oscillating the tire supporting body 15. The sideslip angle imparting actuator 56 is connected to the processing/controlling device 3 through the interface 4.

As shown in FIG. 7, the processing/controlling device 3 is provided with the three-dimensional vehicle model M, the input means 31 capable of operating the vehicle model M and a pair of the tire rolling devices 2, steering angle input means 58 for inputting a steering angle to the vehicle model M, the CPU 32 and the memory 33. The above elements and the interface 4 are connected to each other through the main control means 34.

The vehicle model M is formed as the software of the computer capable of being inputted actual measurement values of the ground height, the ground loads, the front-rear force and the lateral force of the tires T obtained from the ground height measurement means 24 of the ground height control means 16, the ground load measurement means 17, the front-rear force measurement means 18 and the lateral force measurement means 41. Since a steering mechanism is not described in the vehicle model M of the present embodiment, the steering angle input means 58 in which the steering mechanism is described is connected separately. However, the steering angle input means 58 may be integrated with the vehicle model M. Alternatively, the steering angle input means 58 may be integrated with the input means 31.

Figure 12:
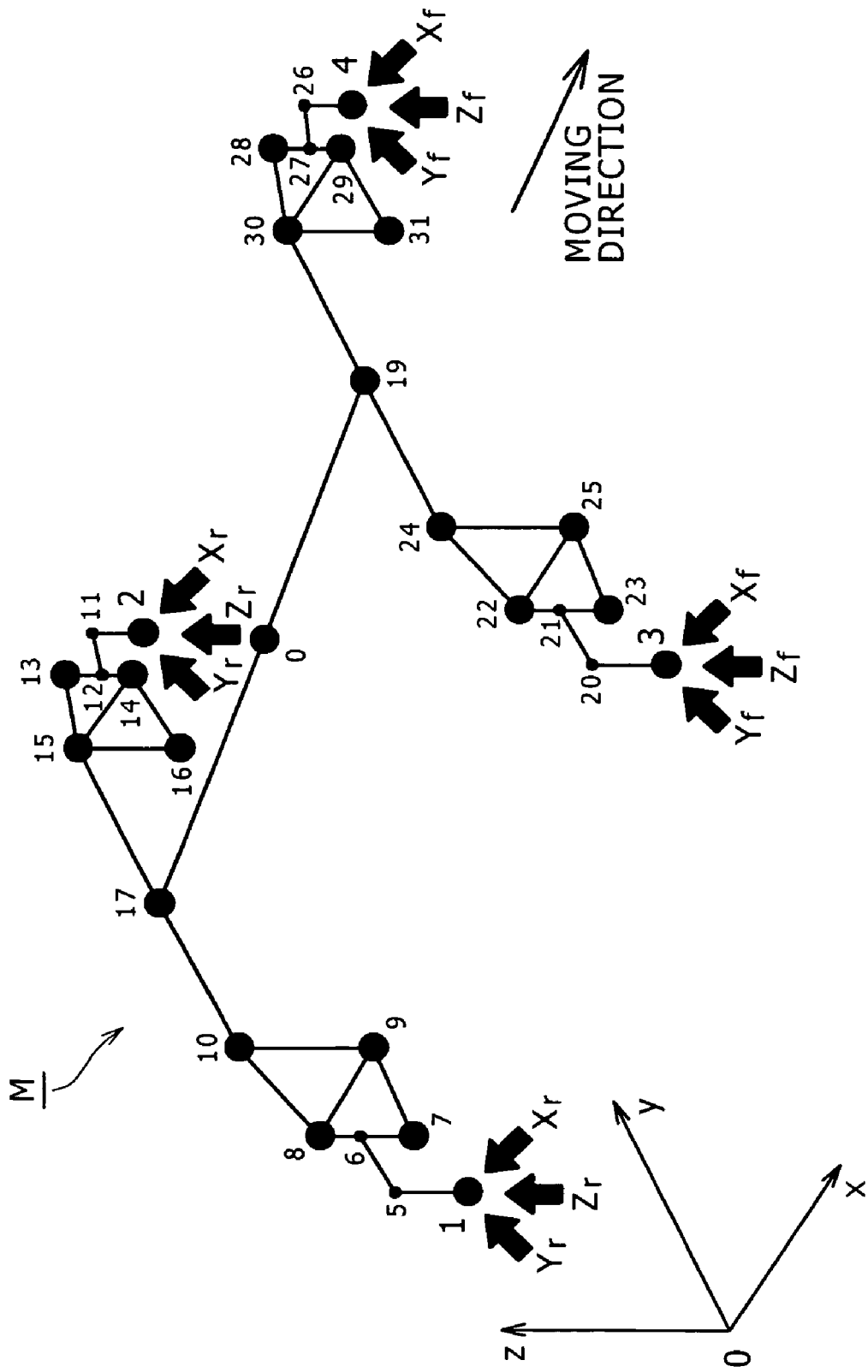
FIG. 12 An image view of a vehicle model.

As shown in a schematic view of FIG. 12, the three-dimensional vehicle model M used in the present embodiment is formed by modeling the vehicle and the suspension mechanism with using the beam element or the truss element in the finite element method, and the rigidity of the vehicle and the geometric nonlinearly of the suspension mechanism are also taken into consideration.

In the vehicle model M, nodes 0 to 31 have six degrees of freedom and are connected by the beam elements in consideration to large rotation in the finite element method. Thereby, the vehicle model M can take the pitching motion, a rolling motion and a yawing motion into consideration in addition to motions in the up and down direction, the front-rear direction and the left and right direction of the vehicle and express a three-dimensional motion of the vehicle.

It should be noted that the vehicle model M of FIG. 12 is formed by modeling a wishbone type suspension, and spring force and damping force of the suspension are expressed as characteristic of the beam element (for a detail, refer to Journal of the Japan Society of Mechanical Engineers (Series C) Volume 69, 685 (2003-9)).

In the present embodiment, by inputting the steering angle by the steering angle input means 58 and the ground loads, the front-rear force, the ground height and the lateral force measured by the measurement means 17, 18, 24 and 41 to the vehicle model M as input values, the three-dimensional motion is calculated in the vehicle model M. By outputting command values of the ground loads, the sideslip angles and the camber angles derived on the basis of the above calculation to the servomotor and the actuator respectively, the ground height, the sideslip angles and the camber angles to be imparted to the tires T are controlled, and thereby a state which is close to an actual running state is reproduced.

Figure 13:
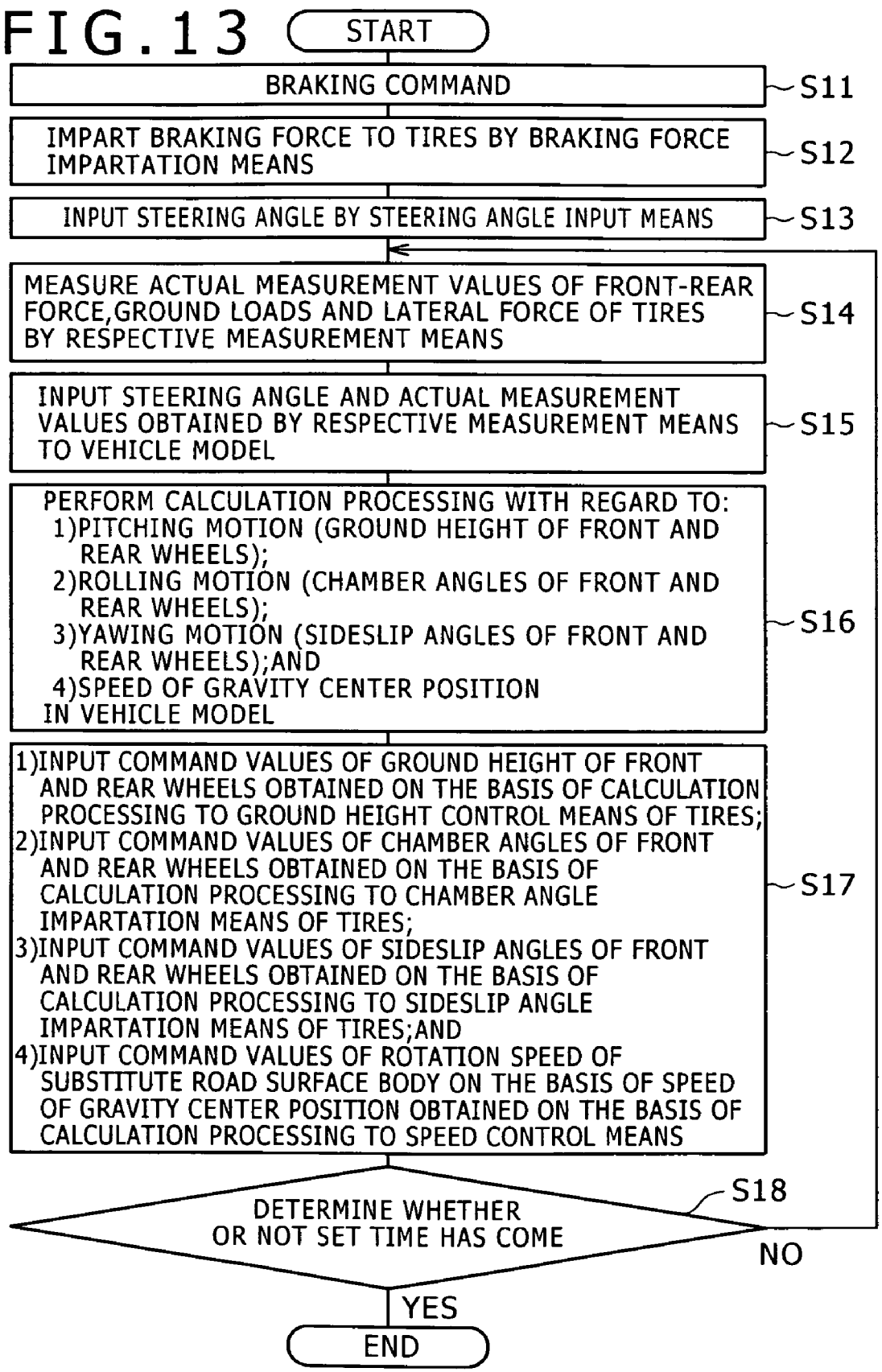
FIG. 13 A flowchart showing a process for controlling the tires.

The braking characteristic test apparatus 1 for the tires T according to the present embodiment has the above configuration. Next, a description will be given to a process for controlling a pair of the tires T rolling on the virtual road surface 9a by the braking characteristic test apparatus 1 with reference to FIG. 13.

Firstly, in Step S11, the braking command is inputted to the braking force impartation means 19 through the input means 31. Thereby, the flow moves to Step S12, and the braking force is respectively imposed on a pair of the tires T rolling on the virtual road surface 9a by the braking force impartation means 19 which receives the braking command. At the above time, it is possible to set the braking force to be imposed on the tires T in accordance with the braking command in Step S11, and the braking force is properly set in accordance with a demand of an operator. By imposing the braking force, the front-rear force and the ground loads are imposed on a pair of the tires T.

Then, the flow moves to Step S13, and the steering angle is inputted to the vehicle model M by the steering angle impartation means 58.

Here, a description will be given to a deriving process of the sideslip angle to be imparted to the tire T which is set to be the front wheel by the vehicle model M.

Figure 14:
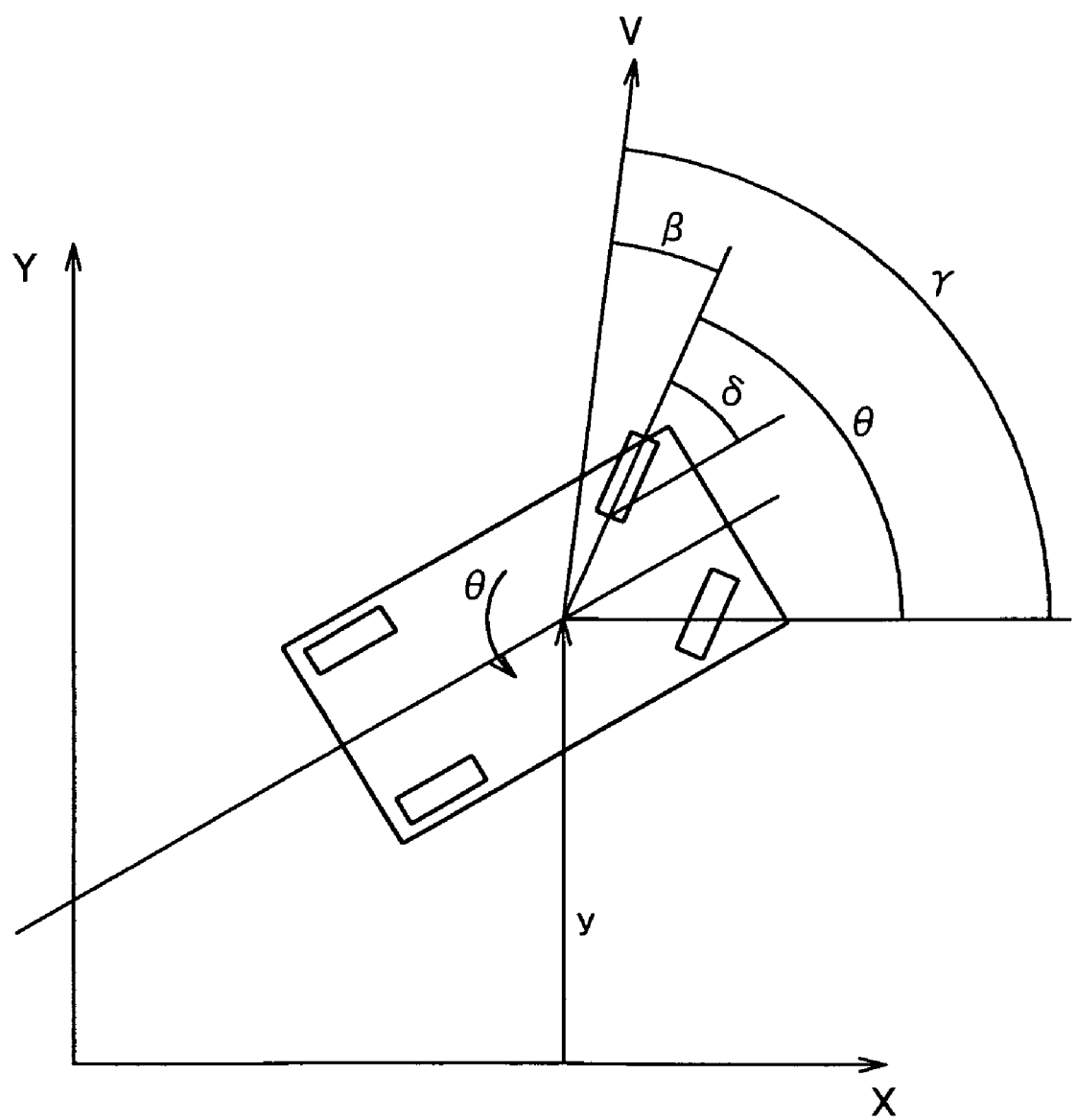
FIG. 14 An explanatory view showing definitions of terms used in the present invention.

As shown in FIG. 14, in the present embodiment, in the case where a steering angle δ is inputted to the vehicle model M running at the speed V by the steering angle impartation means 58, angles $\gamma_f$ and $\gamma_r$ relative to the x axis of the front wheel and the rear wheel of the vehicle model M are determined by the following equations (7) and (8).

[Numerical Expression 3]

$$\Upsilon_f = \frac{1}{v}\dot{y}_0 + \frac{l_f}{v}\dot{\theta}_{z0} \tag{7}$$

$$\Upsilon_r = \frac{1}{v}\dot{y}_0 + \frac{l_r}{v}\dot{\theta}_{z0} \tag{8}$$

$\gamma_f, \gamma_r$: Angle of front and rear wheels relative to x axis
$\dot{y}_0$: Speed of node 0 in the y direction
$\dot{\theta}_{x0}$: Rotation angle speed of node 0 around z axis
V: Vehicle speed
$l_f, l_r$: Length from node 0 to front and rear wheels in the x direction Angles $\theta_f$ and $\theta_r$ between the direction of the front and rear wheels and the x axis are determined by the following equations (9) and (10).

[Numerical Expression 4]

$$\theta_f = \theta_{z0} + \delta \tag{9}$$

$$\theta_r = \theta_{z0} \tag{10}$$

$\theta_f, \theta_r$: Angle between direction of front and rear wheels and x axis
δ: Steering angle
$\theta_{z0}$: Angle between node 0 and x axis Then, sideslip angles $\beta_f$ and $\beta_r$ of the front and rear wheels are derived from the following equations (11) and (12).

[Numerical Expression 5]

$$\beta_f = \gamma_f - \theta_f \tag{11}$$

$$\beta_r = \gamma_r - \theta_r \tag{12}$$

$\beta_f, \beta_r$: Sideslip angle of front and rear wheels

The sideslip angles $\beta_f$ and $\beta_r$ of the front and rear wheels are derived through the vehicle model M. By inputting the sideslip angles $\beta_f$ and $\beta_r$ to the sideslip angle imparting actuator 56 of the tire supporting portion 7 for supporting the tire T which is set to be the front wheel as the command values, the sideslip angle is imparted to the tire T, and thereby the lateral force is imposed on the tire T.

Then, the flow moves to Step S14, and the front-rear force, the ground loads and the lateral force imposed on the tires T are measured by the front-rear force measurement means 18, the ground load measurement means 17 and the lateral force measurement means 41. Then, the flow moves to Step S15, and the actual measurement values of the front-rear force, the ground loads and the lateral force obtained by the measurement means 17, 18 and 41 are inputted to the vehicle model M. Then, the flow moves to Step S16, and the calculation processing is performed through the vehicle model M on the basis of the above actual measurement values. The calculation processing is performed with regard to the three-dimensional motion of the vehicle model M on the basis of the actual measurement values, and the pitching motion, the rolling motion, the yawing motion, the speed change, other motions and the like of the vehicle model M are calculated.

Then, the flow moves to Step S17, and command values obtained on the basis of calculation values of the ground height, the camber angles, the sideslip angles of the tires T and the rotation speed of the substitute road surface body 9 obtained by the above calculation processing are respectively inputted to the ground height control means 16 of the tire supporting portion 7, the angle control means 40 and the speed control means 13 of the driving portion 6. Thereby, the ground height and the camber angles of the tires T are controlled on the basis of the command values, the sideslip angles are controlled again on the basis of the command values, and further the speed of the substitute road surface body 9 is also controlled on the basis of the command values. Therefore, the three-dimensional braking characteristic of the vehicle model M obtained by the calculation processing is reflected on the tires T.

Then, the flow moves to Step S18, and it is determined whether or not the set time has come. When it is determined to be NO, the flow moves to Step S14 and the process from Step S14 to Step S17 is repeated. When it is determined to be YES in Step S18, the process of controlling the braking state of the tires T is finished.

Alternatively, in a state that the three-dimensional braking characteristic of the vehicle model M is reflected in such a way, the ground height, the front-rear force, the ground loads and the lateral force of the tires T are measured again by the respective measurement means 24, 17, 18 and 24. The calculation processing as mentioned above is performed again on the actual measurement values obtained from the above measurement. The command values obtained from the above can be inputted again to the ground height control means 16 and the speed control means 13. By such a process, it is further possible to perform the braking characteristic test of the tires T in a state which is extremely close to the actual running test.

According to the present embodiment, since four tires T by a pair of the tire rolling devices 2 are respectively set to be front and rear wheels of the vehicle model M, the braking characteristic of each tire T influenced by the braking characteristic of the vehicle can be measured. It is possible to perform the braking characteristic test of the tires T in a state which is extremely close to the actual running test.

In the present embodiment, the steering angle is inputted by the steering angle input means 58 after inputting the braking command. However, the order of the above input may be switched.

Figure 15:
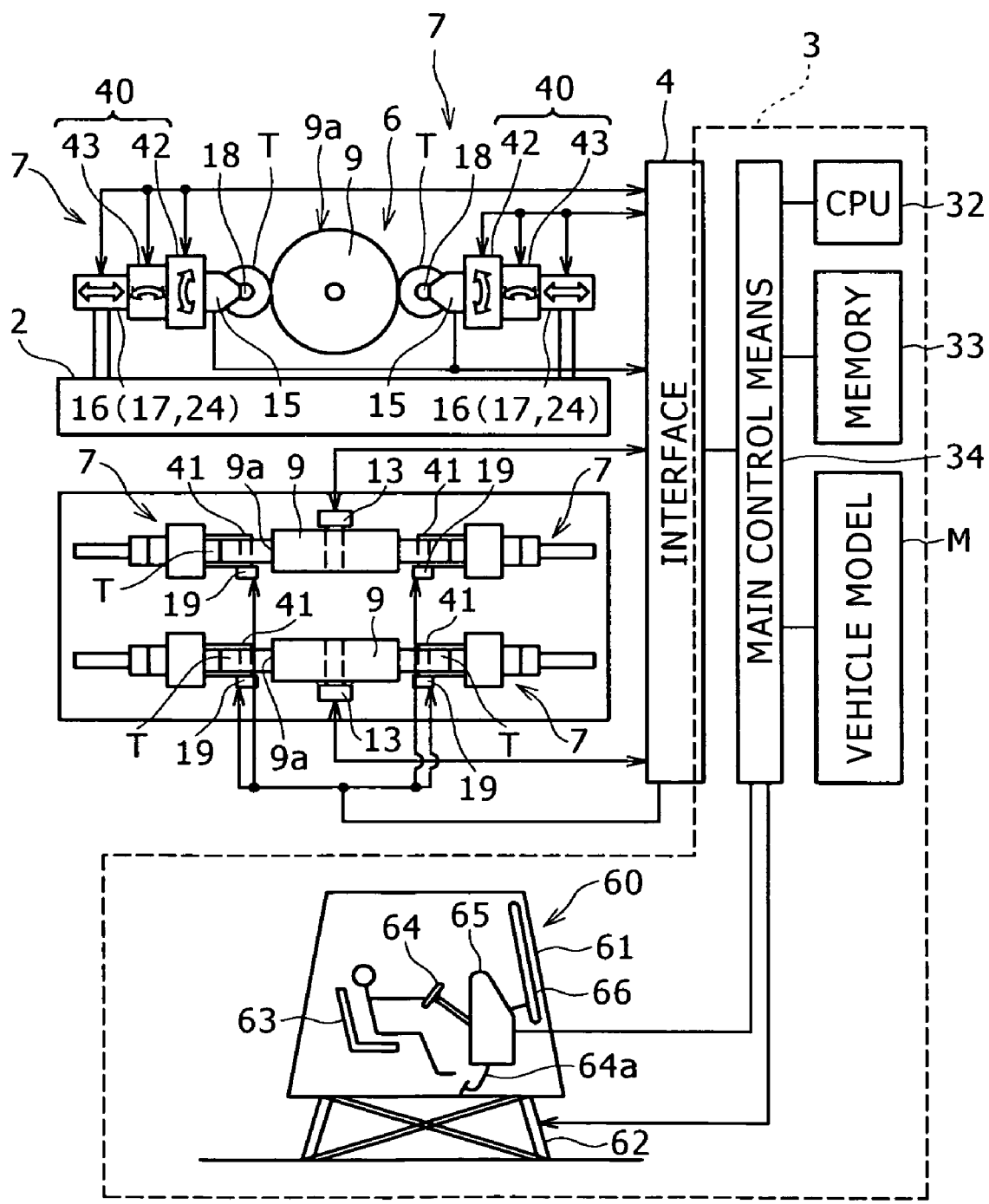
FIG. 15 A system configuration diagram showing a third embodiment of the tire braking characteristic test apparatus.
Figure 16:
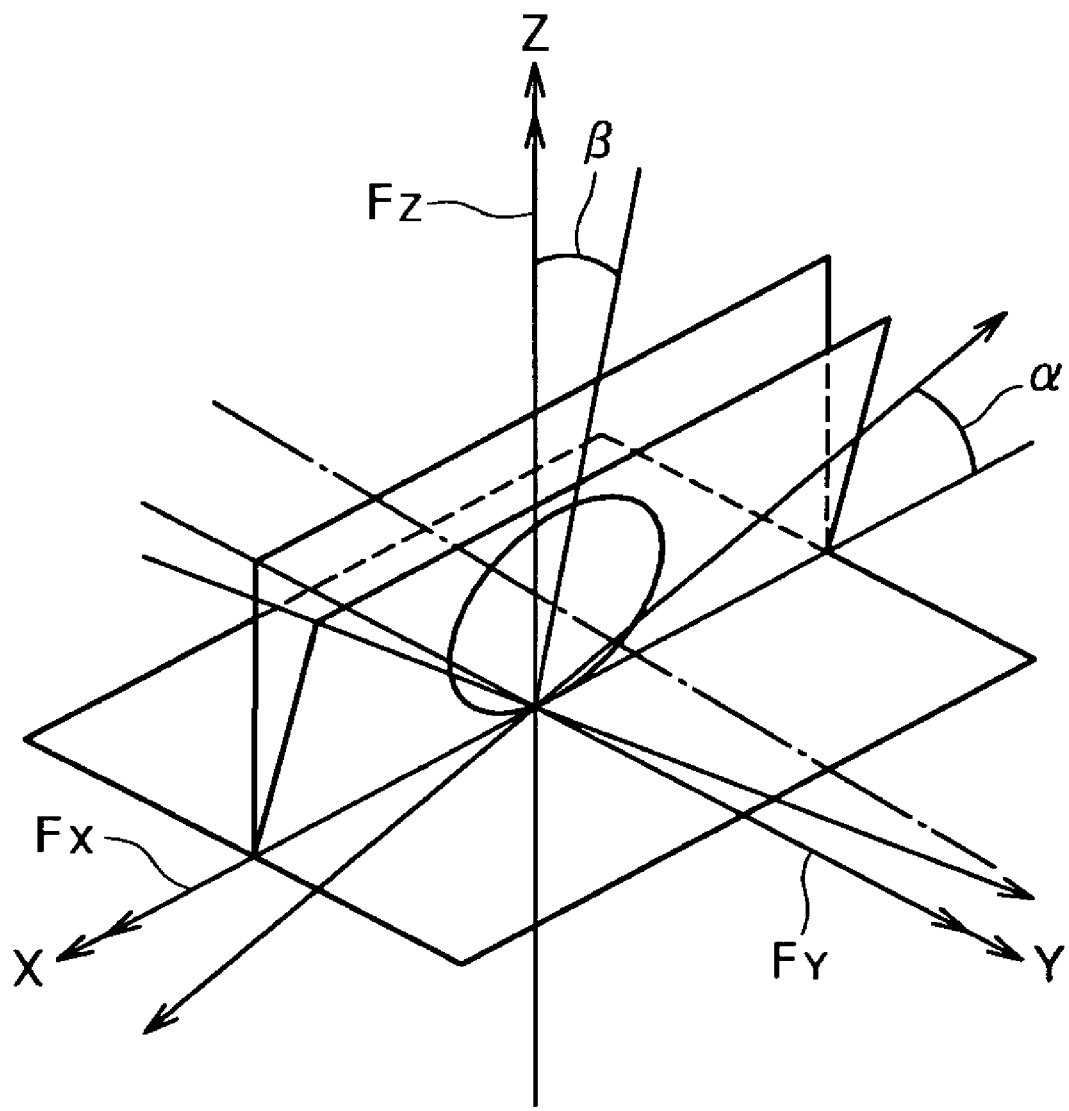
FIG. 16 An explanatory view showing definitions of terms used in the present invention.

FIG. 15 is a system configuration diagram showing a third embodiment of the present invention. The processing/controlling device 3 is provided with a simulation driving device 60.

The simulation driving device 60 is provided with a simulation vehicle body 61 and a supporting device 62 for supporting the simulation vehicle body 61.

A seat 63 as well as an actual vehicle is arranged in the simulation vehicle body 61, and also a steering handle 64 forming the steering impartation means 58, and a braking pedal 64a forming the braking force impartation means 19 and a driving operation device 65 having an acceleration pedal, an instrument panel and the like and forming the input means 31 are arranged. The above steering handle 64, the braking pedal 64a and the driving operation device 65 are connected to the vehicle model M through the interface 4.

The driving operation device 65 is provided with a display 66 for displaying outlook from front glass in a running state.

The supporting device 62 for supporting the simulation vehicle body 61 is connected to the vehicle model M through the interface 4, for linking with a driving operation of the operator and moving or inclining the simulation vehicle body 61 in the up and down direction so as to give the same motion of the vehicle as in the actual running to the simulation vehicle body 61.

In the present embodiment, by operating the steering handle 64 of the driving operation device 65, the steering angle is inputted to the vehicle model M. Then, a state quantity thereof and the lateral force are inputted to the vehicle model M and dynamic behavior of the vehicle model M is calculated. Command values on the basis of the calculation processing are outputted to the servomotor or the actuator of the tire supporting portion 7 of the tire rolling device 2. Thereby, the tires T of the tire rolling device 2 are controlled. Since the command values in accordance with the dynamic behavior of the vehicle model M are outputted to the driving operation device 65 and the supporting device 62, the simulation driving device 60 is controlled.

Therefore, according to the present embodiment, vehicle behavior at the time of running is reproduced in a state which is extremely close to the actual running test state.

Although the embodiment of the present invention is described above in detail, the present invention is not limited to the above embodiment. For example, only one tire supporting portion 7 among a pair of the supporting portions 7 arranged in the substitute road surface body 9 can be provided with the braking force impartation means 19.

Even in the case where the processing/controlling means 3 provided with the three-dimensional vehicle model M is connected to only one of the tire rolling devices 2 with setting the tires T of one of the tire supporting portions 7 to be both the front wheels and the tires T of the other tire supporting portion 7 to be both the rear wheels, the same effect is obtained as the present embodiment.

Tractive load measurement means for measuring a tractive load (traction resistance) imposed on the tires T, lateral displacement control means for measuring and controlling displacement of the tires T in the lateral direction and the like can be arranged in the tire rolling device 2. When actual measurement values obtained from the above means are inputted to the vehicle model M and command values obtained from the calculation processing by the vehicle model M are inputted to the above means, it is possible to realize a running state which is further dose to the actual running.

In the process for controlling the tires T, the front-rear force, the ground loads and the lateral force imposed on the tires T are measured by the front-rear force measurement means 18, the ground load measurement means 17 and the lateral force measurement means 41 and at the same time the ground height of the tires T is measured by the ground height measurement means 24 of the ground height control means 16 so that the actual measurement values of the ground height by the ground height measurement means 24 can be introduced in the following calculation processing.

The invention claimed is:

1. A tire braking characteristic test apparatus, comprising:
a substitute road surface body;
a pair of tires capable of rolling on a virtual road surface formed by said substitute road surface body;
braking force impartation means capable of imparting braking force to at least one of said tires;
angle control means for controlling a sideslip angle of the at least one of said tires;
ground height control means capable of controlling ground height of said tires;
ground load measurement means capable of measuring ground loads of said tires;
front-rear force measurement means capable of measuring front-rear force of said tires;
speed control means capable of controlling speed of said substitute road surface body; and
processing/controlling means provided with a two-dimensional vehicle model adapted to be inputted actual measurement values of the ground loads and the front-rear force of said tires obtained from said ground load measurement means and said front-rear force measurement means, for performing a calculation processing with regard to a motion of the vehicle model on the basis of the actual measurement values, and outputting command values on the basis of the calculation processing to said ground height control means and said speed control means to control a rolling state of a pair of said tires.

2. The tire braking characteristic test apparatus according to claim 1 wherein
said processing/controlling means is provided with a simulation driving device, and
a steering angle input means which is arranged in the simulation driving device.

3. A tire braking characteristic test apparatus, comprising:
a substitute road surface body;
a pair of tires capable of rolling on a virtual road surface formed by said substitute road surface body;
braking force impartation means capable of imparting braking force to at least one of said tires;
angle control means for controlling a camber angle and a sideslip angle of the at least one of said tires;
ground height control means capable of controlling ground height of said tires;
ground load measurement means capable of measuring ground loads of said tires;
front-rear force measurement means capable of measuring front-rear force of said tires;
lateral force measurement means capable of measuring lateral force of said tires;
speed control means capable of controlling speed of said substitute road surface body; and
processing/controlling means provided with a three-dimensional vehicle model adapted to be inputted actual measurement values of the ground loads, the front-rear force and the lateral force of said tires obtained from said ground load measurement means, said front-rear force measurement means and said lateral force measurement means, and steering angle input means capable of inputting a steering angle to the vehicle model, for performing a calculation processing with regard to a motion of the vehicle model on the basis of the actual measurement values and the steering angle, and outputting command values on the basis of the calculation processing to said angle control means, said ground height control means and said speed control means to control a rolling state of a pair of said tires.

4. The tire braking characteristic test apparatus according to claim 3, comprising two sets of said substitute road surface bodies, a pair of said tires, said braking force impartation means, said angle control means, said ground height control means, said ground load measurement means, said front-rear force measurement means, said lateral force measurement means, and said speed control means.

5. The tire braking characteristic test apparatus according to claim 4, wherein
said processing/controlling means is provided with a simulation driving device, and
said steering angle input means is arranged in the simulation driving device.

6. The tire braking characteristic test apparatus according to claim 3, wherein
said processing/controlling means is provided with a simulation driving device, and
said steering angle input means is arranged in the simulation driving device.

* * * * *